United States Patent
Nielsen et al.

(10) Patent No.: US 12,420,950 B1
(45) Date of Patent: Sep. 23, 2025

(54) MULTIFUNCTIONAL WINGTIP LIGHTS

(71) Applicants: Christian Nielsen, Palm Coast, FL (US); Daniel Stenko, Kosice (SI); Javier Gordillo, Pribram VI (CZ); Martin Suvak, Kosice (SK)

(72) Inventors: Christian Nielsen, Palm Coast, FL (US); Daniel Stenko, Kosice (SI); Javier Gordillo, Pribram VI (CZ); Martin Suvak, Kosice (SK)

( * ) Notice: Subject to any disclaimer, the term of this patent is extended or adjusted under 35 U.S.C. 154(b) by 0 days.

(21) Appl. No.: 19/238,234

(22) Filed: Jun. 13, 2025

(51) Int. Cl.
*B64D 47/06* (2006.01)
*B64D 47/04* (2006.01)

(52) U.S. Cl.
CPC .............. *B64D 47/06* (2013.01); *B64D 47/04* (2013.01)

(58) Field of Classification Search
CPC ........ B64D 47/02; B64D 47/04; B64D 47/06; B64D 2203/00; F21W 2107/30
See application file for complete search history.

(56) References Cited

U.S. PATENT DOCUMENTS

| | | | | |
|---|---|---|---|---|
| 2,571,158 | A * | 10/1951 | Orlansky | B64D 47/06 362/470 |
| 12,000,581 | B1 * | 6/2024 | Maddali | F21V 5/046 |
| 2005/0007257 | A1 * | 1/2005 | Rast | B64D 47/04 340/815.45 |
| 2005/0093718 | A1 * | 5/2005 | Martin | H05B 45/3577 340/981 |
| 2008/0158012 | A1 * | 7/2008 | Hagan | H05B 47/11 340/961 |
| 2009/0161376 | A1 * | 6/2009 | Giffen | B64D 47/06 340/945 |
| 2011/0299293 | A1 * | 12/2011 | Stout | B64D 47/06 362/470 |
| 2015/0146443 | A1 * | 5/2015 | Gagnon | B64D 47/04 362/470 |
| 2016/0096635 | A1 * | 4/2016 | Hessling Von Heimendahl | B64D 47/06 362/470 |
| 2016/0345401 | A1 * | 11/2016 | Hessling-Von Heimendahl | H05B 45/12 |
| 2018/0016032 | A1 * | 1/2018 | Jha | B64D 47/02 |
| 2018/0281989 | A1 * | 10/2018 | Schoen | B64D 47/06 |

* cited by examiner

*Primary Examiner* — Alexander K Garlen
(74) *Attorney, Agent, or Firm* — Barry Choobin; Patent 360

(57) ABSTRACT

A multifunctional wingtip light for aircraft, integrating a taxi light, a navigation chip-on-board (COB) light module, a strobe COB light module, a landing light module, and an optional ground illumination module within an aerodynamically optimized housing. The configuration enhances aircraft visibility, operational safety, and retrofit compatibility while reducing drag and improving energy efficiency.

8 Claims, 8 Drawing Sheets

MULTIFUNCTIONAL WINGTIP LIGHTS

FIELD OF INVENTION

The present invention relates generally to aircraft lighting systems and, more particularly, to a multifunctional wingtip light for aircraft that integrates navigation, positioning, strobe, landing, taxi, recognition, and ground illumination functionalities.

BACKGROUND

Wingtip lights, also referred to as position lights, are conventionally mounted on the wingtips and tail of an aircraft. These lights serve to indicate the aircraft's orientation and direction of movement, thereby enhancing visibility to other aircraft in the vicinity, particularly during low-light conditions or poor visibility. While wingtip lights have been widely adopted and in use for many decades, their design and functionality have remained largely unchanged. Existing wingtip light assemblies are often relatively heavy, contribute to increased drag, and typically lack an aerodynamically optimized profile. These limitations can negatively affect aircraft performance, fuel efficiency, and overall operational safety.

Existing systems are limited in modularity, functionality integration, and retrofitting ease, thereby necessitating a more unified and efficient solution.

SUMMARY OF THE INVENTION

The following provides a simplified summary of one or more embodiments of the present invention to facilitate a basic understanding of the invention. This summary is not intended to provide an exhaustive overview of all possible embodiments, nor to identify essential features or define the scope of the invention. Rather, it serves to introduce certain concepts that are further described in detail in the subsequent sections.

The principal object of the present invention is therefore directed to a multifunctional wingtip light for an aircraft.

Another object of the present invention is that the wingtip light is lightweight and aerodynamic.

Still, another object of the present invention is that the wingtip light can be retrofitted into an aircraft.

Yet another object of the present invention is that the wingtip light is versatile in design.

In one aspect, the present invention provides a multifunctional wingtip light for aircraft that integrates various lighting modules—including taxi, navigation, strobe, landing, and ground illumination—within a single aerodynamic and retrofit-friendly housing.

In one aspect, disclosed is a wingtip light for an aircraft, the wingtip light comprises a housing; a taxi light module mounted to the housing; a navigation chip-on-board (COB) light module mounted to the housing; a strobe COB light module mounted to the housing; and a landing light module mounted to the housing. The wingtip further comprises a ground illumination module. The taxi light module, the navigation chip-on-board (COB) light module, and the strobe COB light module are positioned in a coplanar arrangement while the landing light module is positioned perpendicularly. The housing has a proximal end and a distal end, wherein the housing has a left face, a front face, a right face, and a bottom face, wherein the front face is convex curved extending between the proximal end and the distal end, wherein a first casing is configured on the front face near the proximal end, a second casing configured in a middle of the front face, a third casing configured on the front face near the distal end, and a fourth casing is configured on the right face of the housing. The first casing is for the taxi light module, the second casing is for the navigation chip-on-board (COB) light module, the third casing is for the strobe COB light module, and the fourth casing is for the landing light module.

In one aspect, a method for installing a multipurpose wingtip light in an aircraft is disclosed. The method comprises providing a housing for the multipurpose wingtip light; mounting a taxi light module to the housing; mounting a navigation chip-on-board (COB) light module to the housing; mounting a strobe COB light module to the housing; and mounting a landing light module to the housing.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

The subject matter described herein is presented in detail with reference to the accompanying drawings, which form part of this disclosure and illustrate specific exemplary embodiments. However, the invention may be embodied in various other forms, and the claimed subject matter is not limited to the embodiments shown and described. These examples are provided solely for illustrative purposes. A broad interpretation of the scope is intended, encompassing methods, devices, components, systems, and other implementations. Accordingly, the following detailed description should not be construed as limiting in any way.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limited to embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention, since the scope of the invention will be best defined by the allowed claims of any resulting patent.

Figure 8:
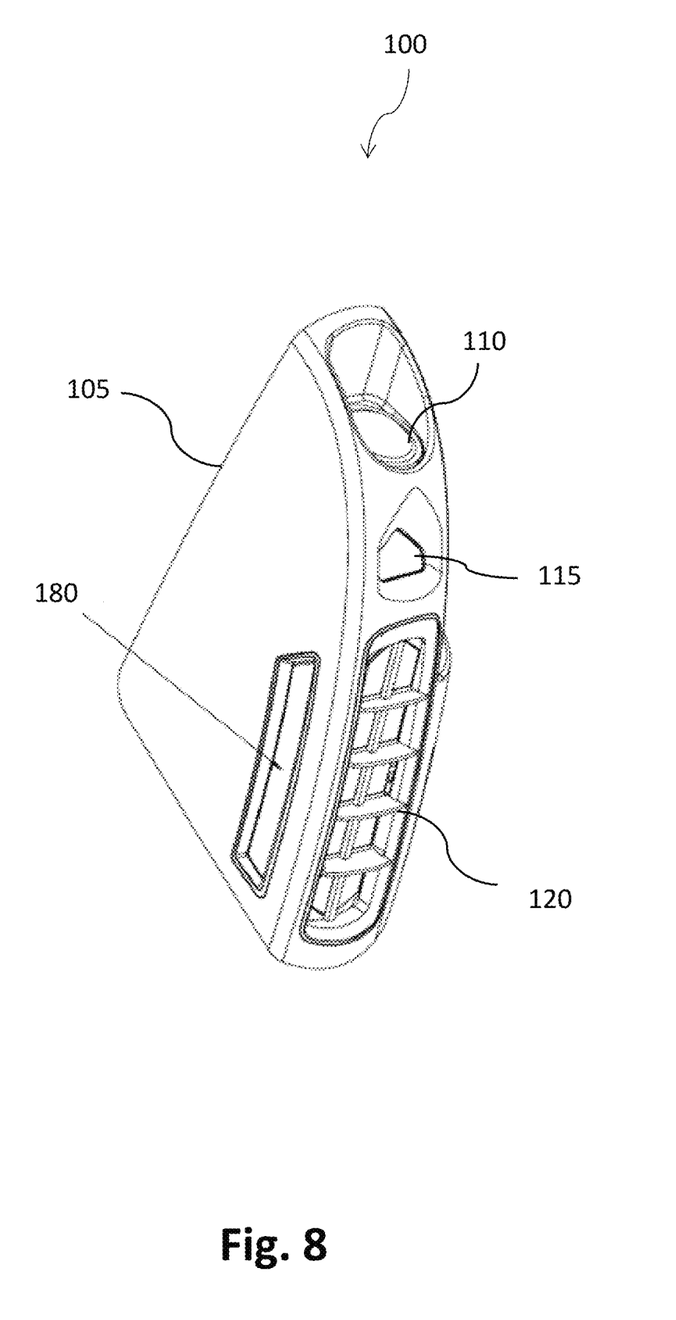
FIG. 8 shows the wingtip light with additional ground illumination light, according to an exemplary embodiment of the present invention.

The invention described pertains to a multifunctional wingtip light for an aircraft. The disclosed wingtip light may include the functionalities of navigation, positioning, strobe, landing and taxi, recognition, and ground illumination. Referring to FIGS. 1-4, which show different views of the disclosed wingtip light 100. The wingtip light 100 includes a housing 105 that encases different lights and electronic components of the disclosed wingtip light 100. The wingtip light 100 includes a taxi light module 110, a navigation chip-on-board (COB) light module 115, a strobe COB light module 120, and a landing light module 125. The disclosed wingtip light 100 may also include a ground illumination module 180 as shown in FIG. 8. The shape of the housing may be a critical feature of the invention that allows incorporating different lights in optimum and efficient positions.

The housing may be of a right-angle shape, having a convex curved outer portion. The housing has a proximal end and a distal end, wherein a curved front extends between the proximal end and the distal end. The housing may also have a left face, a front face, a bottom face, and a right face. The left face and the bottom face may be planar. The front face may be curved as described above for a curved front, and the right face may be bulky with a three-faced cutout near the proximal end. A first casing in the housing may be provided for the taxi light module 110 on the front face near the proximal end. A second casing may be provided for the navigation chip-on-board (COB) light module 115 in the middle of the front face. A third casing may be provided for the strobe COB light module 120 on the front face near the distal end. A fourth casing may be provided in the housing for the landing light module 125 on the right face in the three-faced cutout. The taxi light module 110, the navigation chip-on-board (COB) light module 115, and the strobe COB light module 120 may be coplanar, while the landing light module 125 may lie perpendicular to the said coplanar light modules. The ground illumination module 180, as shown in FIG. 8, may lie on the left face. Also, the housing may be universal in shape and may easily be retrofitted on most types of aircraft.

Figure 1:
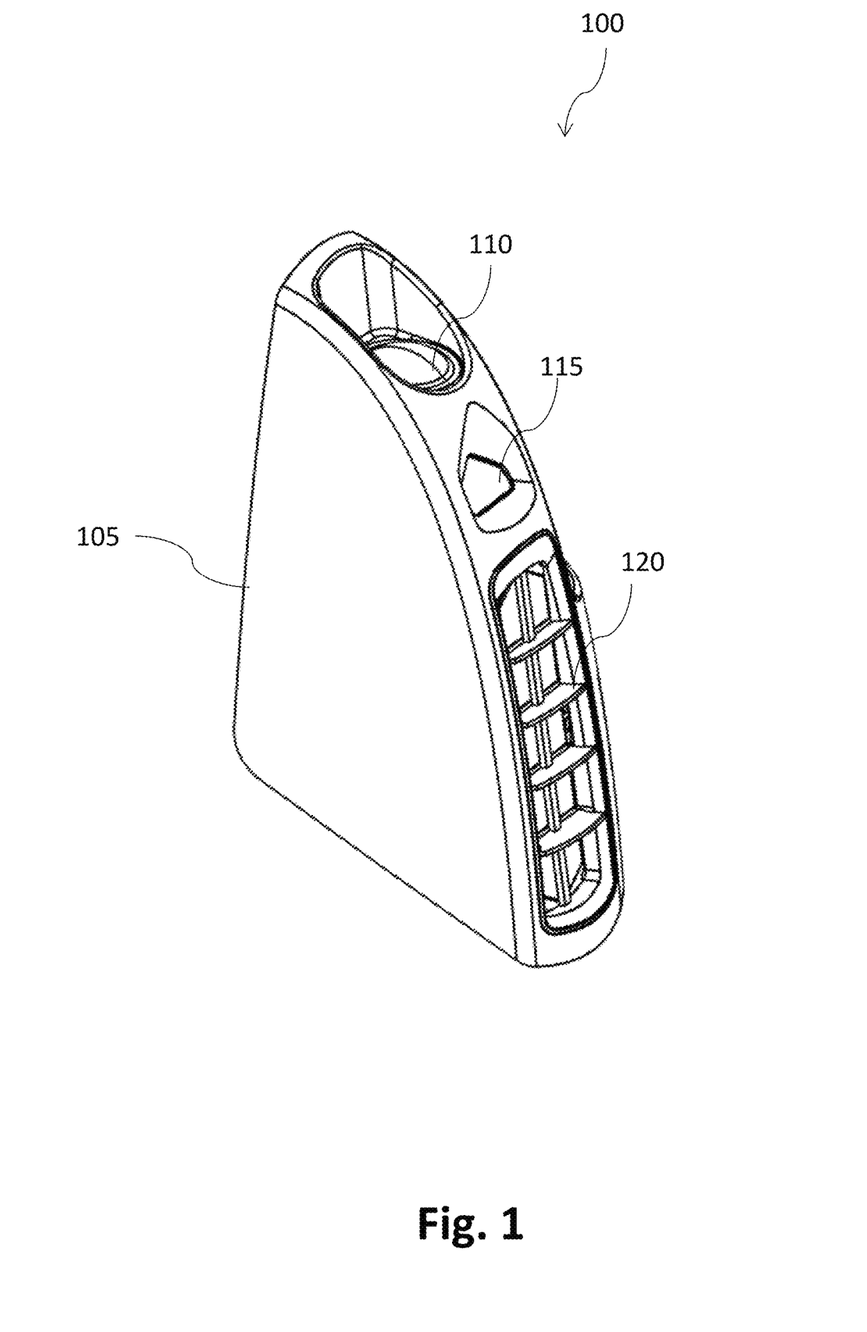
FIG. 1 is a perspective view of a wingtip light, according to an exemplary embodiment of the present invention.
Figure 2:
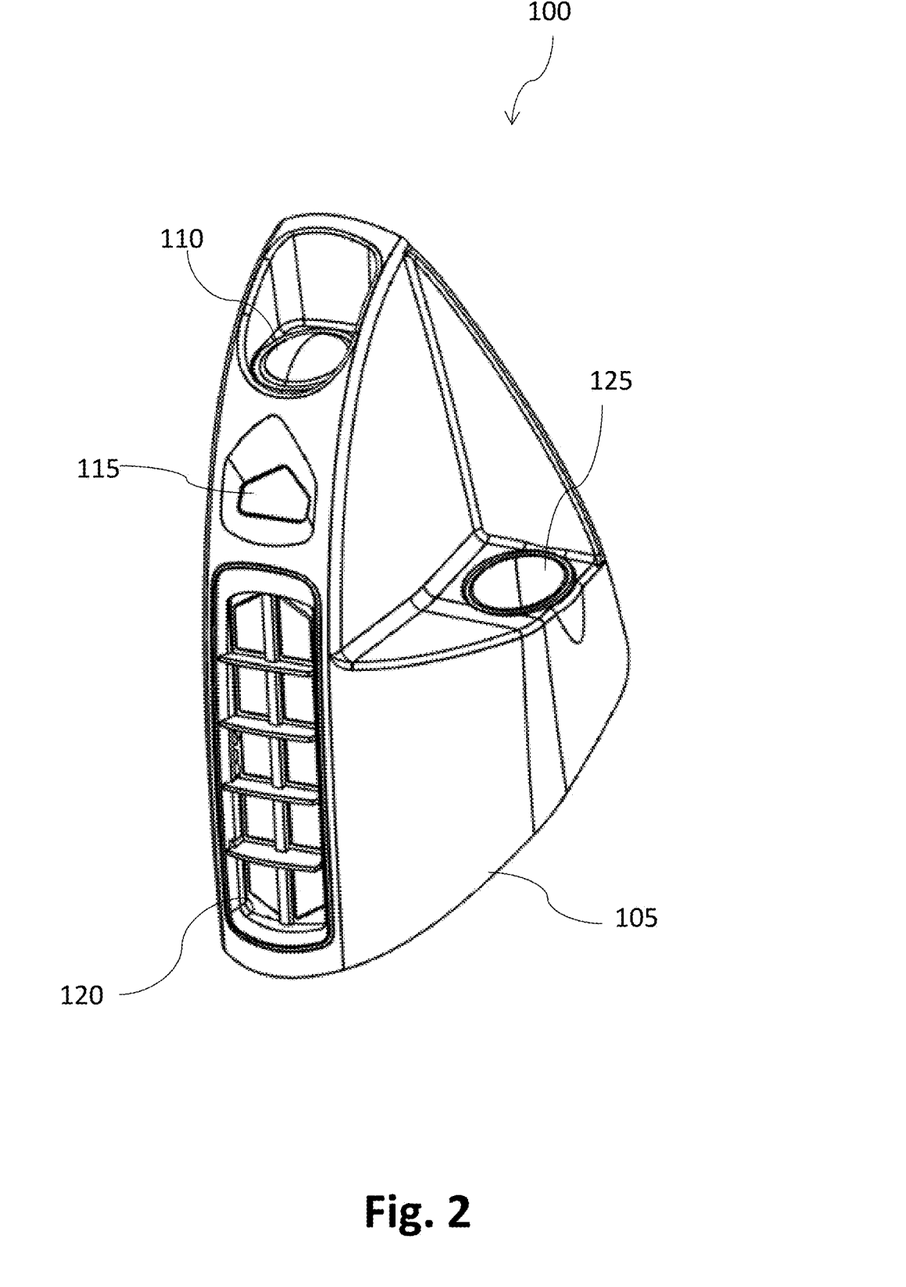
FIG. 2 shows another perspective view of the wingtip light, according to an exemplary embodiment of the present invention.
Figure 3:
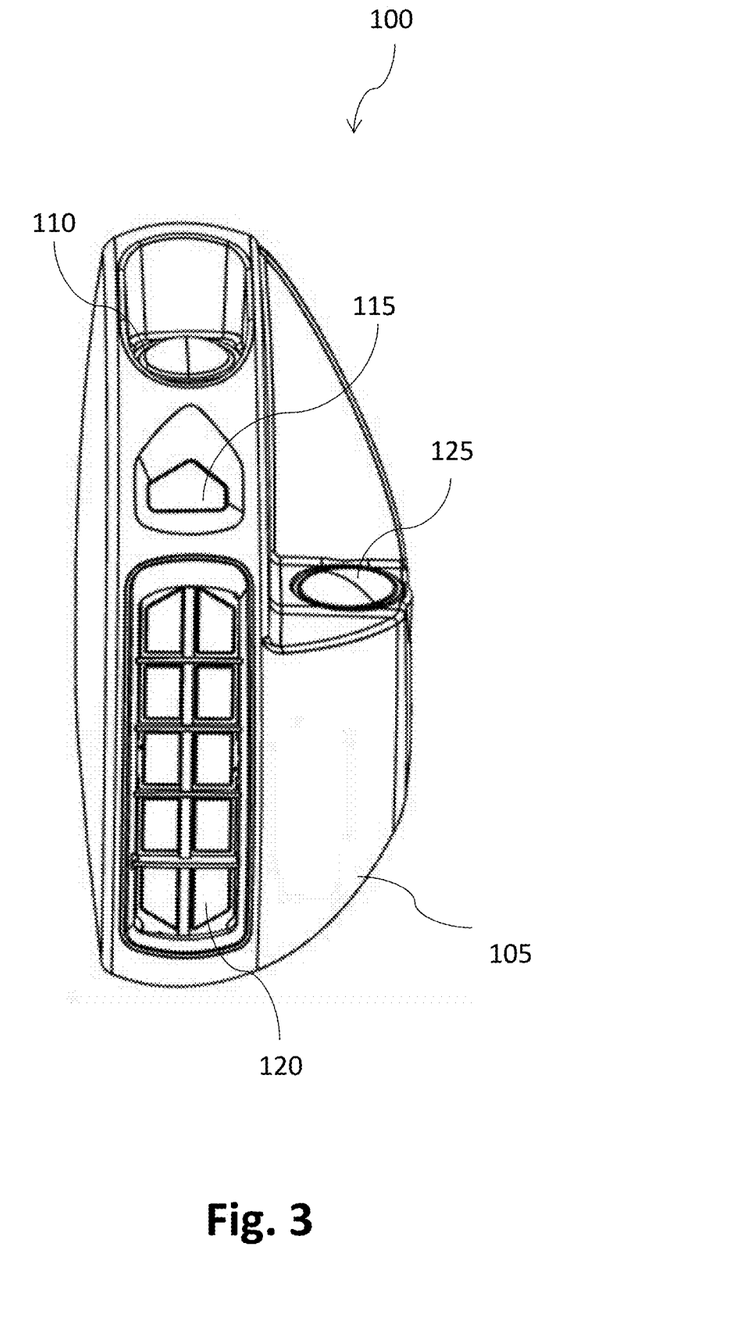
FIG. 3 shows a front view of the wingtip light, according to an exemplary embodiment of the present invention.
Figure 4:
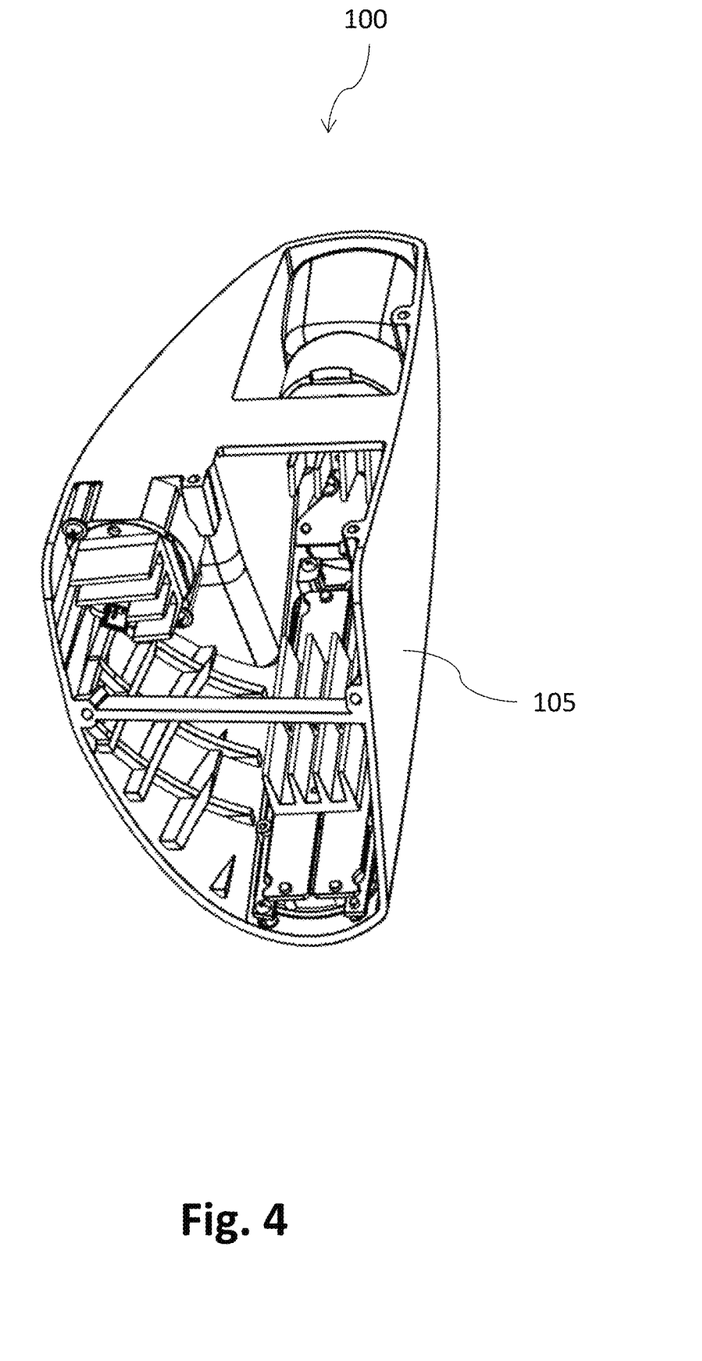
FIG. 4 shows a rear perspective view of the wingtip light, according to an exemplary embodiment of the present invention.

The ground illumination module 180 includes a novel Chip-On-Board light integrated within the casing that provides ground illumination light below the wingtips for ground personnel safety and the prevention of collision with other aircraft wingtips or ground vehicles or people, or even hangar structures, etc., when taxiing the aircraft. FIG. 4 shows the inside of the housing, which is spacious for dissipating heat. Each COB light module according to the present invention may have heat sinks for dissipating the heat. FIG. 4 shows the light modules with the heat sinks.

Figure 5:
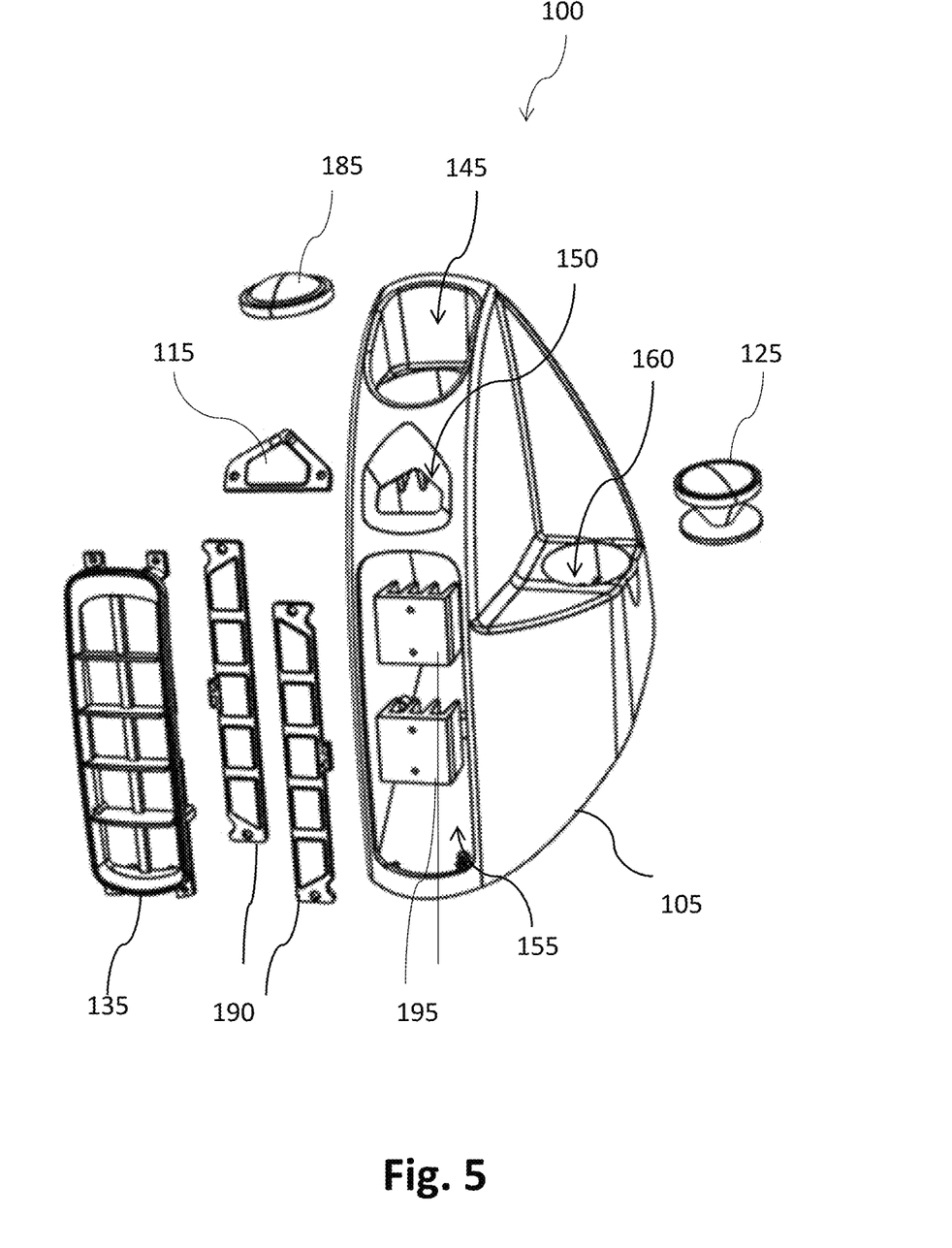
FIG. 5 shows an exploded view of the wingtip light, according to an exemplary embodiment of the present invention.
Figure 6:
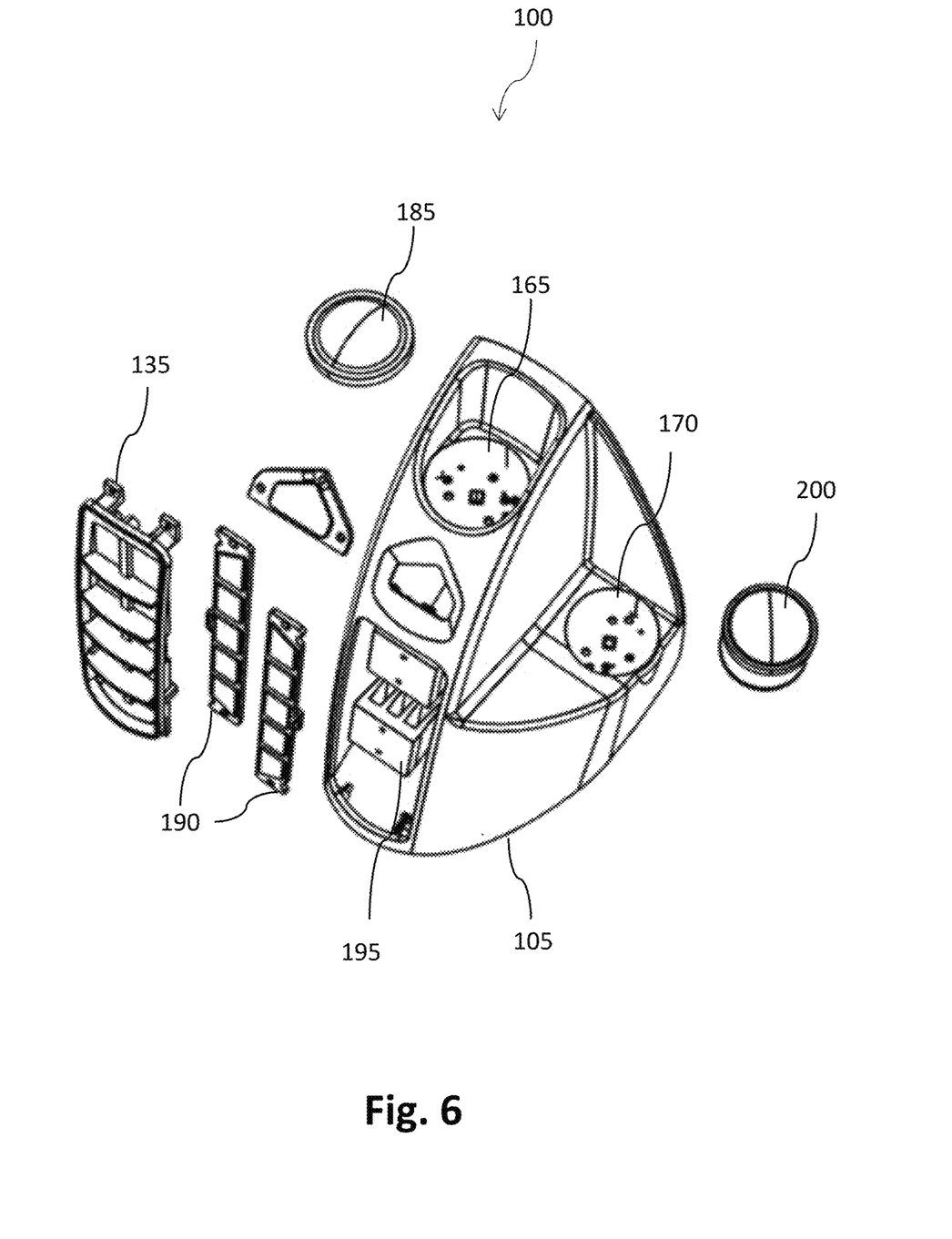
FIG. 6 shows another exploded view of the wingtip light, according to an exemplary embodiment of the present invention.
Figure 7:
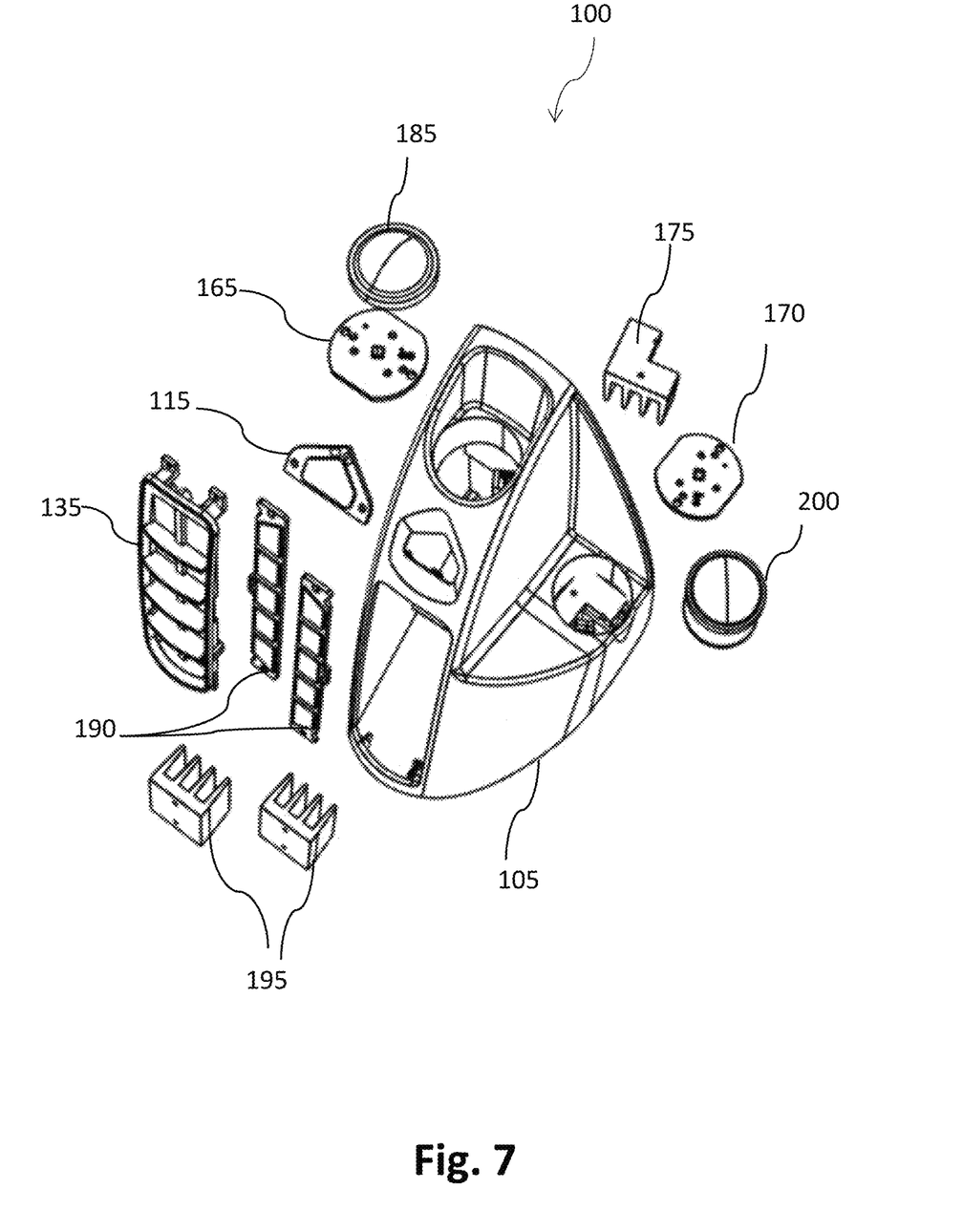
FIG. 7 shows another exploded view of the wingtip light, according to an exemplary embodiment of the present invention.

Referring to FIGS. 5-7, which shows exploded views of the wingtip light 100, according to an exemplary embodiment of the present invention. FIG. 5 shows the first casing 145, the second casing 150, the third casing 155, and the fourth casing 150 for different light modules according to the present invention. FIGS. 6 and 7 show the lens cover 185 and the COB LED 165 of the taxi light module 110. FIGS. 6 and 7 further show the lens cover 135, a pair of strobe lights 190, and a pair of heat sinks of the pair of strobe lights of the strobe COB light module 120. FIGS. 6 and 7 also show the lens cover 200, a COB LED 170, and a heat sink 175 of the landing light module 125. Thus, the different COB-based light modules according to the present invention may provide efficient and superior different-purpose lights compared to conventional halogen bulbs or normal LEDs.

While foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A wingtip light for an aircraft, the wingtip light comprises:
   a housing;
   a taxi light module mounted to the housing;
   a navigation chip-on-board (COB) light module mounted to the housing;
   a strobe COB light module mounted to the housing; and
   a landing light module mounted to the housing;
   wherein the taxi light module, the navigation chip-on-board (COB) light module, and the strobe COB light module are positioned in a coplanar arrangement while the landing light module is positioned perpendicularly.

2. The wingtip light according to claim 1, wherein the wingtip further comprises a ground illumination module.

3. The wingtip light according to claim 1, wherein the housing has a proximal end and a distal end, wherein the housing has a left face, a front face, a right face, and a bottom face, wherein the front face is convex curved extending between the proximal end and the distal end, wherein a first casing is configured on the front face near the proximal end, a second casing configured in a middle of the front face, a third casing configured on the front face near the distal end, and a fourth casing is configured on the right face of the housing.

4. The wingtip light of claim 3, wherein the first casing is for the taxi light module, the second casing is for the navigation chip-on-board (COB) light module, the third casing is for the strobe COB light module, and the fourth casing is for the landing light module.

5. A method for installing a multipurpose wingtip light in an aircraft, the method comprises:
   providing a housing for the multipurpose wingtip light;
   mounting a taxi light module to the housing;
   mounting a navigation chip-on-board (COB) light module to the housing;
   mounting a strobe COB light module to the housing; and
   mounting a landing light module to the housing;

wherein the taxi light module, the navigation chip-on-board (COB) light module, and the strobe COB light module are positioned in a coplanar arrangement while the landing light module is positioned perpendicularly.

6. The method according to claim 5, wherein the wingtip further comprises a ground illumination module.

7. The method according to claim 5, wherein the housing has a proximal end and a distal end, wherein the housing has a left face, a front face, a right face, and a bottom face, wherein the front face is convex curved extending between the proximal end and the distal end, wherein a first casing is configured on the front face near the proximal end, a second casing configured in a middle of the front face, a third casing configured on the front face near the distal end, and a fourth casing is configured on the right face of the housing.

8. The method of claim 7, wherein the first casing is for the taxi light module, the second casing is for the navigation chip-on-board (COB) light module, the third casing is for the strobe COB light module, and the fourth casing is for the landing light module.

* * * * *